United States Patent Office 2,702,446
Patented Feb. 22, 1955

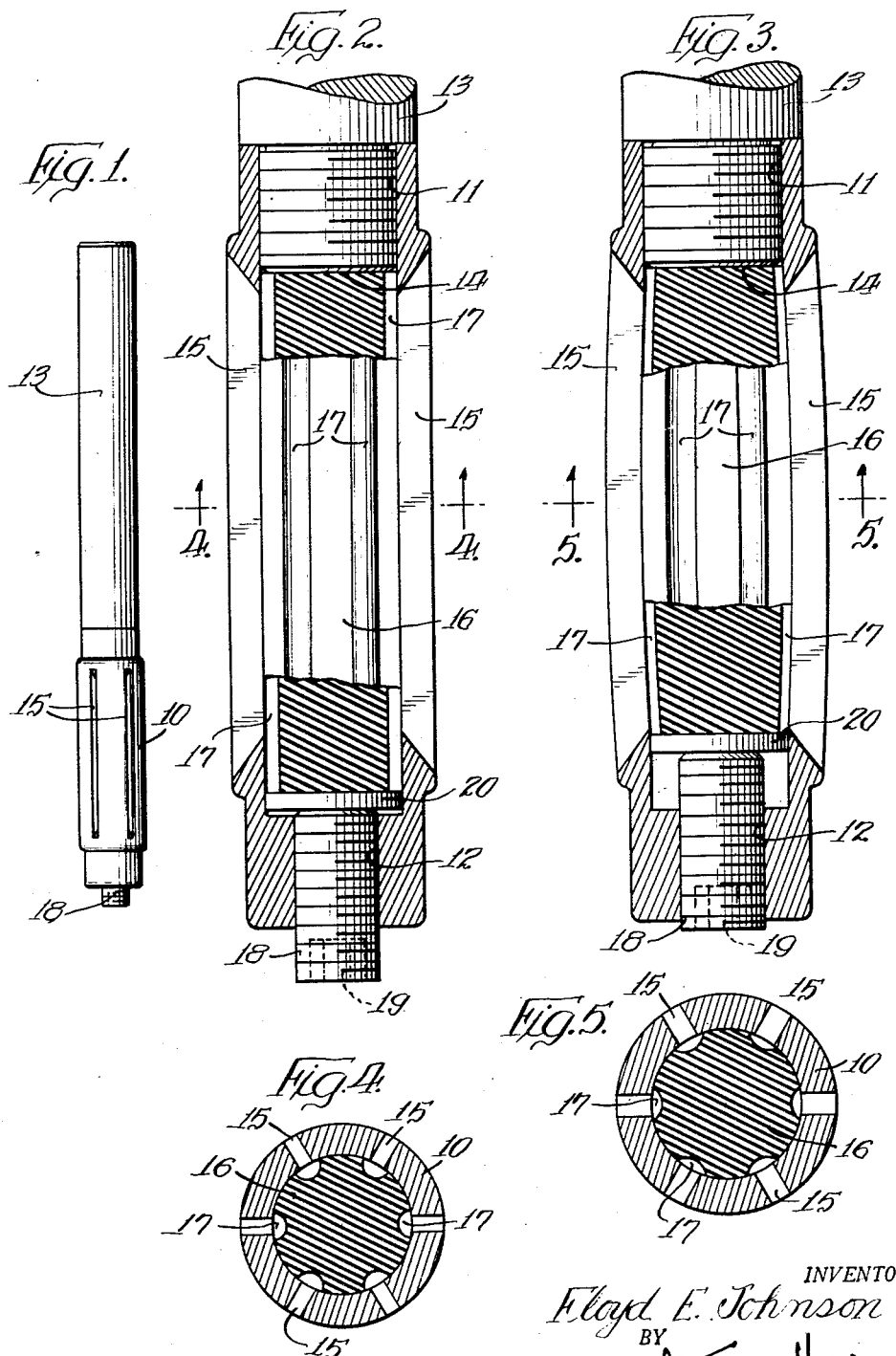

2,702,446
LAP

Floyd E. Johnson, Chicago, Ill.

Application June 4, 1952, Serial No. 291,696

6 Claims. (Cl. 51—184.1)

This invention relates to laps of the type used for lapping or finishing the inner surfaces of cylindrical holes, bores or the like, and more particularly a tool of this character wherein a slit or series of slits provided in the walls of a metallic tubular head form resilient segments between the slits and an expansible insert of resilient material confined in said head is adapted to be compressed thereby expanding the sides of the head to adjust the effective diameter of the resilient segments.

It is an object of this invention to provide an expansible insert of such design and construction as to prevent portions of the insert opposite the slits from entering the slits when the insert is compressed to expand the sides of the head.

It is a further object of this invention to avoid entry of portions of the insert into said slits during expansion of the sides of the head without necessitating the use of auxiliary liners or the like between the insert and the interior of the head.

Other objects of the invention will in part be obvious and will in part appear hereinafter.

The invention accordingly comprises the features of construction, combination of elements and arrangement of parts, which will be exemplified in the construction hereinafter set forth and the scope of the invention will be indicated in the claims.

For a fuller understanding of the nature and objects of the invention reference should be had to the following detailed description taken in connection with the accompanying drawing, in which:

Fig. 1 is a side view of the lap;

Fig. 2 is an enlarged longitudinal sectional view;

Fig. 3 is a view like Fig. 2 showing the relative position of parts when the insert is compressed to expand the sides of the head.

Fig. 4 is a cross-section taken substantially on line 4—4 of Fig. 2.

Fig. 5 is a similar section taken substantially on line 5—5 of Fig. 3.

Reference being had more particularly to the drawings, the lap forming a preferred embodiment of this invention includes a tubular metallic head 10 of cylindrical design. Opposite ends of the head 10 are internally threaded as at 11 and 12. A shank or stem 13 by which the lap is held in a drill or other suitable machine tool for operating the same has threaded connection with the end 11 of the head and provides an abutment 14 facing inwardly of the head.

The head 10 is provided with a series of longitudinal slits 15 spaced apart at uniform distances circumferentially of the head in parallel relation to the longitudinal axis of the head. The slits 15 terminate short of the threaded ends 11 and 12 whereby the wall portions of the head 10 between the slits 15 provide resilient segments which are adapted to be expanded to vary the diameter of the head. Such segments are thus expanded by means of an expansible insert of resilient material such as "neoprene" or other substance preferably resistant to heat and grease, identified by the reference numeral 16. It will be noted from the drawings that the insert 16 extends substantially the length of the head between the threaded ends 11 and 12 and has close fit with the interior of the walls of the head except for the area of the insert which is in alignment with and opposite the slits 15 which is defined by longitudinal channels 17. These channels 17 are somewhat wider than the slits 15 so as to present the surface portions of the insert at opposite sides of the channels 17 at a distance removed from the slits 15 thereby assuring that such surface portions of the insert will not obtain entry to the slits 15 when the insert is subjected to pressure to expand the segments of the head between said slits.

While the lap illustrated in the drawings shows the use of six slits 15 in the head 10 and a corresponding number of channels 17 in the insert 16, it will be understood that this number may be varied as desired.

The insert 16 is caused to be expanded against the segments of the head by any suitable means such as a threaded pin or stud 18 engaging the threaded end 12 of the head 10. The outer end of the pin or stud 18 is provided with a shaped portion 19 for engagement by a wrench or adjusting tool. If desired, the pin or stud 18 is operative to act directly against the insert 16 or through an intermediate disk 20 of suitable material. Thus as the portion 19 of the stud 18 is turned to advance along the threaded end 12 of the head 10 the insert 16 is pressed endwise against the abutment 14 of the shank or stem 13 facing inwardly of the head 10, causing the insert 16 to expand and in turn act on the head 10 to expand the segments between the slits 15. While the insert 16 is thus undergoing expansion to likewise expand the segments between the slits 15, the channels 17 are widened and yet when so flattened are constantly kept from entering the slits. While the channels 17 are of arcuate cross-sectional contour it is to be understood that such form may be varied.

By maintaining the threaded ends 11 and 12 of the head 10 of uniform size, the head 10 may be reversed with respect to the shank or stem 13 and the pin or stud 18.

From the foregoing it will be seen that the present invention provides a lap of simple construction having a single solid resilient insert which is maintained against entry in the slits of the head 10 without the use of auxiliary devices such as liners and the like.

What is claimed is:

1. In a lap, the combination of a tubular head having a series of substantially longitudinal slits which terminate at a distance from the opposite ends thereof and provide circumferentially arranged expansible segments, a fixed abutment in said head adjacent one end thereof, an expansible insert formed of resilient material in said head and engaging with said abutment, and expanding means engaging said expansible insert for compressing the insert and expanding the segments to adjust the effective diameter of the head, and pre-formed depressed areas in said insert of such size and location relative to the slits as to prevent entry of portions of the insert opposite said slits into said slits when the insert is undergoing available expansion.

2. In a lap, the combination of a tubular head of cylindrical shape having a series of substantially longitudinal slits which terminate at a distance from the opposite ends thereof and provide circumferentially arranged expansible segments, a fixed abutment in said head adjacent one end thereof, an expansible insert formed of resilient heat and grease resistant material in said head and engaging with said abutment, and expanding means engaging said expansible insert for compressing the insert and expanding the segments to adjust the effective diameter of the head, and pre-formed channels formed in said insert opposite said slits of such size as to prevent entry of portions of the insert in said slits when the insert is undergoing available expansion.

3. In a lap as claimed in claim 2 wherein said channels are of arcuate cross-sectional contour.

4. In a lap as claimed in claim 1 wherein said slits are substantially parallel to the longitudinal axis of the head.

5. In a lap as claimed in claim 2 wherein said channels are of greater dimension than said slits in directions circumferentially of said head.

6. In a lap as claimed in claim 2 wherein said channels are of greater dimension than said slits in directions circumferentially of said head and of gradually diminishing width in directions radially inward from said slits.

References Cited in the file of this patent

UNITED STATES PATENTS

| 2,326,711 | Weiland | Aug. 10, 1943 |
| 2,340,399 | Macy | Feb. 1, 1944 |
| 2,410,493 | Gideon | Nov. 5, 1946 |

FOREIGN PATENTS

| 563,199 | Great Britain | Aug. 2, 1944 |